A. FOLLIET.
AGGLOMERATING PROCESS.
APPLICATION FILED MAY 25, 1911.
1,029,182.
Patented June 11, 1912.
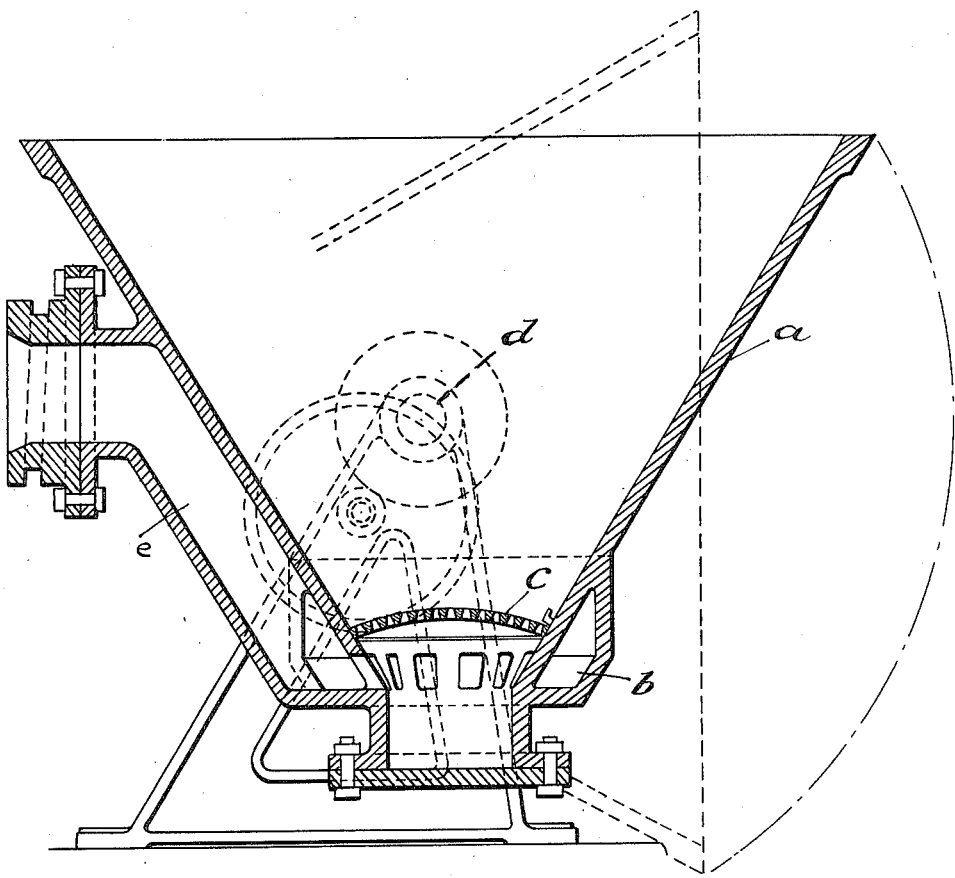

UNITED STATES PATENT OFFICE.

ALEXANDRE FOLLIET, OF BRUSSELS, BELGIUM.

AGGLOMERATING PROCESS.

1,029,182.   Specification of Letters Patent.   Patented June 11, 1912.

Application filed May 25, 1911. Serial No. 629,288.

*To all whom it may concern:*

Be it known that I, ALEXANDRE FOLLIET, a subject of France, residing at Brussels, Belgium, have invented certain new and useful Improvements in Agglomerating Processes, of which the following is a specification.

The present invention has for its object to suitably agglomerate by reaction the residue or by-products, containing iron and lead (either with or without precious metals) obtained in the form of ash or any other fine state unsuiting them for smelting, with a view to their final metallurgical treatment in a shaft furnace for the recovery of the lead.

This process relates more particularly to the treatment of the plumbiferous residue obtained by the concentration of the material residual to the treatment of zinc ores by reduction and distillation in retorts or muffles of zinc furnaces. These products, which are in the nature of a sort of grayish grit, are always rich in metallic iron with a part in the form of lower oxids in a particular state and in the presence of a rather high proportion of silicic acid largely combined with the bases present. The quantity of lead may vary in rather large proportions, as also the silver content. Heretofore it has been necessary in order to treat these products to resort to operations which are both costly and of little practical merit, the principal being:

1. Briquetting in machines in the presence of a little lime. Not only is the cost of this operation comparatively high, but it results in a hard compressed product which must be dried before using, and the very compact texture of which is undesirable for the final metallurgical treatment. Moreover, it is necessary to concentrate the contents of the residue by washing, thus increasing the loss of metals (lead or silver) by the waste in the washing.

2. Treatment in a reverberatory furnace, with a view to bringing about agglomeration by calcination and scorification, with agitation of the mass and with the eventual addition of fluxes to facilitate the operation. This last operation, in addition to the cost of the fuel and the hand work, occasions loss of metals by volatilization.

The present invention is based on the fact that the particular state in which iron is contained in the plumbiferous residue of zinc retort furnaces makes it a combustible and scorifying element of a character peculiarly suited to the object in view, and obviating the necessity of bringing the mass to an elevated temperature.

In carrying out the invention, the residues, of which the composition is known, are suitably prepared. If necessary, suitable quantities of silica, in the form of sand, and of limestone or lime, for obtaining a scoria suitable for the shaft furnace, are added. These added materials enter in combination under the influence of the energy liberated in the subsequent reaction and moderate the activity thereof.

It is very desirable to add a part of the lime in the form of milk of lime so as to obtain a suitable degree of humidity in the total mass (about six per cent. of water). This addition of milk of lime is very advantageous with reference to the mixture and gives a certain cohesiveness to the prepared mass.

The accompanying drawing represents in section a suitable apparatus in which to carry out the invention.

For carrying out the reaction there may be used a truncated conical shaft $a$, such as shown in the accompanying drawing of a determined capacity, the bottom of which is provided with an annular air chamber $b$ supplied with air by the pipe $e$ surmounted by a metal disk $c$ provided with a large number of conical holes constituting a grate. The shaft may be mounted on two trunnions $d$ like a Bessemer converter. The apparatus may be of any suitable form. On the grate are placed fragments of combustible material, such as coke or charcoal, mixed with pieces of limestone or quick-lime to form a base. This fuel is lighted and by blowing brought to incandescence. The prepared material is then charged upon the base to a considerable thickness, and the blowing of air upward through the grate and through the material is continued. The combustion of the readily oxidizable iron and its combinations commences immediately, and the incandescence progresses from bottom to top with the result that the material concentrates and agglomerates in a semi-scorified, porous characteristic mass. At the moment when the surface commences to become red, more of the material is charged into the shaft, and this is continued until the filling is complete. In proportion as the thickness of the bed increases the air pressure is increased. When the operation is terminated the apparatus is uptilted to dump out the loaf obtained, which is broken in pieces ready to pass to the smelting furnace. During the reaction there may be a partial liquefying of the mass.

It will be obvious that any suitable kind of apparatus may be adopted for carrying out the process.

During the process the oxidizable iron and its combinations in the residues furnish all the heat necessary for the agglomeration of the entire mass. The iron is, in fact, in what may be termed a pyrophoric state. The reaction is rapid and may be extremely energetic. The reaction may even attain such violence that it is possible to have molten matter and sparks projected from the mass.

A second mode of operation is to cause the current of air or gas to traverse the material in a downward direction, working with a bed of invariable thickness. In this case the kindling combustible is disposed on the top surface of the prepared material and the reaction is propagated from above downward. This last mode of procedure has advantages in certain special cases.

A development of the process is the treatment, simultaneously with the ferruginous and plumbiferous residues, of ores or material (argentiferous or not) containing lead in oxidized form, such as carbonates, sulfates, scoria, etc., in earthy, gritty, slimy, powdery, or other "fine" conditions. In carrying out this form of the process these materials are incorporated with the mass of the iron-containing residues to complete the constitution of the mass. These added materials find their natural mode of agglomeration, utilizing a part of the considerable energy developed by the combustion of the iron.

A very material advantage of the process is the complete avoidance of the loss of metals by volatilization. Moreover, from the hygienic standpoint the process presents maximum security.

Not only may oxidized lead materials be admitted to the mixture, but also, up to a certain limit, sulfur ores and materials such as galena, bournonite, boulangerite, mattes, etc., in various "fine" conditions unsuited for metallurgical treatment.

It is believed that the reactions which take place in this instance are as follows: The oxidizable iron and the magnetic oxid existing in the zinc furnace residues, carried to a temperature sufficient to provoke the reaction, under the influence of air blown in, oxidize with a considerable development of calorific energy, having the effect of carrying to a high temperature the materials with which they are in contact, in the nature of oxids, sulfur compounds and gangues. The lead sulfid in particular is transformed principally to sulfate. Diluted as it is in a mass of material preventing the direct reaction of the undecomposed sulfid on the sulfate formed, this sulfid cannot for this reason become smelted, being instead rapidly transformed into sulfate in proportion as the temperature of sulfatization is reached. The ferric oxid, in the nascent state and at high temperature, formed at this time by the excess of oxygen carried by the air blown in, reacts directly on the sulfate of lead formed and existing as well as on the alkaline earth sulfates present, to liberate the sulfuric anhydrid $SO_3$ and its dissociation products.

In the presence of the elements of the bed of fusion the oxids of iron and lead, under the influence of the temperature engendered, agglomerate in a mass porous but dense, admirably suited for the final treatment in a shaft furnace. The quantity of combustible iron existing, giving to this term the most general meaning, limits, therefore in effect, the other elements present which will contribute to the composition of the final product. Thus it limits the quantity of metallic sulfids, particularly lead sulfid, susceptible of being mixed with the plumbiferous residues of the zinc works, for the purpose of advantageously utilizing the energy developed.

It will be understood that the lead-bearing fine materials added to the iron-containing residues may be either that class containing lead in an oxidized state or lead sulfid or both. As an example of proportions I may give the following: Where the total iron content in the zinc furnace residues, expressed in FeO, is 30–35% or more, 20–25% of lead oxid or sulfid materials may be added. A good composition of the slag resulting from the treatment of my agglomerated residues in a water-jacket furnace for the recovery of the lead is the following: $SiO_2$, 25–27%, FeO, MnO, 35–40%. CaO, 18–20%, the remainder being ZnO and $Al_2O_3$, as far as possible not exceeding 10% each. The mixture for agglomeration should be prepared with this or other suitable formula in view, $SiO_2$ and CaO being added in the form of sand and lime in proper proportions.

What I claim as new is:

1. An agglomerating treatment preliminary to the recovery of lead contained in the fine residues of zinc furnaces, comprising suitably preparing said fine material containing, in addition to the lead to be eventually recovered, iron in such readily oxidizable state and quantities as to agglomerate the whole by the heat developed by its combustion, initiating the reaction, and blowing a current of air or gas through the material so as to cause the iron to burn and by its heat to agglomerate the whole mass, substantially as set forth.

2. An agglomerating treatment preliminary to the recovery of lead contained in the fine residues of zinc furnaces, comprising moistening with milk of lime and otherwise suitably preparing said fine material containing, in addition to the lead to be eventually recovered, iron in such readily oxidizable state and quantities as to agglomerate the whole by the heat developed by its combustion, initiating the reaction, and blowing a current of air or gas through the material so as to cause the iron to burn and by its heat to agglomerate the whole mass, substantially as set forth.

3. The method of agglomerating by reaction fine materials containing lead with a view to their further metallurgical treatment for the recovery of the lead, the same comprising incorporating fine materials containing lead in oxidized forms, such as carbonates, sulfates, residues, etc., with the fine residues of zinc furnaces or the like containing both lead and iron, the latter in forms or combinations readily oxidizable and in quantities sufficient by its combustion to agglomerate the whole, and causing a current of air or gas to traverse the suitably prepared mixture after having suitably initiated the reaction.

4. A treatment for the agglomeration of fine materials containing lead with a view to their further metallurgical treatment for the recovery of the lead, the same comprising mixing and suitably preparing fine plumbiferous and ferruginous residues of zinc furnaces or the like with other materials in a fine state containing sulfureted lead, the iron in the said residues being in a state or combinations and in quantities such as to be capable of agglomerating the whole by the heat produced by its combustion, initiating the reaction by means of some fragments of incandescent fuel, and supporting the reaction by causing a current of air or gas to traverse the mixture.

5. A treatment of fine materials with a view to their further metallurgical treatment for the recovery of the lead therein contained, the same comprising mixing fine materials or residues containing iron in readily oxidizable forms or combinations with other materials in a fine state containing sulfureted lead, the latter materials in quantities corresponding to the iron or its combustible combinations, and agglomerating the whole and transforming the sulfid to oxid by causing a current of air or gas to traverse the suitably prepared mixture, first suitably initiating the reaction.

In testimony whereof, I have signed my name to this specification, in the presence of two subscribing witnesses.

ALEXANDRE FOLLIET.

Witnesses:
  M. GERBEAULT,
  G. ROOSEVELT PHELAN.